US009761137B2

(12) United States Patent
Beaurepaire et al.

(10) Patent No.: US 9,761,137 B2
(45) Date of Patent: Sep. 12, 2017

(54) METHOD AND APPARATUS FOR PROVIDING LOCALLY RELEVANT REROUTING INFORMATION

(71) Applicant: HERE Global B.V., Veldhoven (NL)

(72) Inventors: Jerome Beaurepaire, Berlin (DE); Andre Kuhn, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/849,234

(22) Filed: Sep. 9, 2015

(65) Prior Publication Data

US 2017/0069209 A1 Mar. 9, 2017

(51) Int. Cl.
*G08G 1/0968* (2006.01)
*G08G 1/01* (2006.01)
*G08G 1/09* (2006.01)
*G01C 21/34* (2006.01)

(52) U.S. Cl.
CPC ... *G08G 1/096805* (2013.01); *G01C 21/3415* (2013.01); *G08G 1/0125* (2013.01); *G08G 1/0141* (2013.01); *G08G 1/091* (2013.01); *G08G 1/096811* (2013.01); *G08G 1/096844* (2013.01)

(58) Field of Classification Search
CPC .......... G08G 1/096805; G08G 1/0125; G08G 1/0141; G08G 1/091
See application file for complete search history.

(56) References Cited

U.S. PATENT DOCUMENTS

| 6,041,235 | A | * | 3/2000 | Aalto | H04W 36/20 455/437 |
|---|---|---|---|---|---|
| 6,138,072 | A | * | 10/2000 | Nagai | G01C 21/3679 340/988 |
| 6,560,535 | B2 | * | 5/2003 | Levy | G01C 21/165 701/409 |
| 7,197,320 | B2 | | 3/2007 | Joseph | |

(Continued)

FOREIGN PATENT DOCUMENTS

| JP | 2009109465 A | 5/2009 |
|---|---|---|
| WO | 2008100010 A1 | 8/2008 |

OTHER PUBLICATIONS

Strache et al., "Self-Powered Intelligent Sensor Node Concept for Monitoring of Road and Traffic Conditions", Sensors & Transducers Journal, vol. 14-2, Special Issue, Feb. 2012, published Mar. 12, 2012, 26 Pages.

(Continued)

*Primary Examiner* — Calvin Cheung
(74) *Attorney, Agent, or Firm* — Ditthavong & Steiner, P.C.

(57) ABSTRACT

An approach is provided for providing navigation information based on traffic information for a geographic coverage area. The approach involves determining traffic information for at least one geographic coverage area associated with at least one wireless communication access point. The approach also involves aggregating the traffic information in the at least one wireless communication access point. The approach further involves determining navigation information based, at least in part, on the traffic information, wherein the navigation information, the traffic information, or a combination thereof is transmitted from the at least one wireless communication access point to one or more devices within the at least one geographic area.

20 Claims, 14 Drawing Sheets

(56) References Cited

U.S. PATENT DOCUMENTS

| | | | |
|---|---|---|---|
| 7,970,419 B2* | 6/2011 | Oh | G01S 19/05 |
| | | | 455/456.5 |
| 8,483,616 B1* | 7/2013 | Hall | H04W 72/082 |
| | | | 370/442 |
| 8,639,212 B1* | 1/2014 | Sennett | H04W 4/021 |
| | | | 340/539.2 |
| 8,639,409 B2 | 1/2014 | Ramaswamy et al. | |
| 8,842,005 B1* | 9/2014 | Mittal | G08B 21/22 |
| | | | 340/539.22 |
| 9,338,592 B1* | 5/2016 | Mahapatra | H04W 4/02 |
| 2004/0068364 A1 | 4/2004 | Zhao et al. | |
| 2004/0150534 A1 | 8/2004 | Linn | |
| 2005/0124292 A1* | 6/2005 | Holloway | H04W 4/06 |
| | | | 455/41.2 |
| 2007/0106467 A1* | 5/2007 | Sumizawa | G01C 21/26 |
| | | | 701/410 |
| 2009/0239549 A1* | 9/2009 | Grigsby | H04W 48/20 |
| | | | 455/456.1 |
| 2010/0191403 A1* | 7/2010 | Krause | G07C 5/008 |
| | | | 701/31.4 |
| 2010/0317368 A1* | 12/2010 | Augst | H04W 4/16 |
| | | | 455/456.1 |
| 2011/0077862 A1* | 3/2011 | Huang | G01C 21/30 |
| | | | 701/532 |
| 2011/0282577 A1* | 11/2011 | Kang | G01C 21/3658 |
| | | | 701/532 |
| 2012/0166076 A1 | 6/2012 | Hardy | |
| 2013/0226926 A1* | 8/2013 | Beaurepaire | G06K 9/00704 |
| | | | 707/740 |
| 2013/0245932 A1* | 9/2013 | Beaurepaire | G01C 21/20 |
| | | | 701/409 |
| 2013/0311898 A1* | 11/2013 | Beaurepaire | G01C 21/3438 |
| | | | 715/744 |
| 2013/0321269 A1* | 12/2013 | Beaurepaire | G01C 21/3682 |
| | | | 345/158 |
| 2013/0325315 A1* | 12/2013 | Beaurepaire | G01C 21/3423 |
| | | | 701/400 |
| 2013/0345974 A1* | 12/2013 | Beaurepaire | G01C 21/20 |
| | | | 701/533 |
| 2014/0129976 A1* | 5/2014 | Beaurepaire | G01C 21/367 |
| | | | 715/788 |
| 2014/0163861 A1* | 6/2014 | Beaurepaire | G06Q 10/00 |
| | | | 701/400 |
| 2014/0164322 A1* | 6/2014 | Beaurepaire | G06F 17/30575 |
| | | | 707/610 |
| 2014/0188387 A1* | 7/2014 | Beaurepaire | G06F 3/03 |
| | | | 701/533 |
| 2014/0206381 A1* | 7/2014 | Yamada | G01S 5/14 |
| | | | 455/456.1 |
| 2014/0236483 A1* | 8/2014 | Beaurepaire | G01C 21/3626 |
| | | | 701/533 |
| 2014/0337841 A1* | 11/2014 | Hyde | H04W 52/0229 |
| | | | 718/1 |
| 2015/0141036 A1* | 5/2015 | Fix | H04W 64/00 |
| | | | 455/456.1 |
| 2016/0139272 A1* | 5/2016 | Basnayake | G01S 19/14 |
| | | | 342/357.52 |
| 2016/0358479 A1 | 12/2016 | Riedelsheimer et al. | |

OTHER PUBLICATIONS

Smart CCTV, "How Your Mobile Phone is Helps You Avoid Traffic Jams Without You Even Knowing", Web Page, Feb. 7, 2014, retrieved on Sep. 29, 2015 from http://www.smartcctvltd.com/how-your-mobile-phone-is-helps-you-avoid-traffic-jams-without-you-even-knowing/, 2 Pages.

Notification of Transmittal of the International Search Report and the Written Opinion of the International Searching Authority, or the Declaration for corresponding International Application No. PCT/EP2016/070881, dated Dec. 6, 2016, 13 Pages.

* cited by examiner

500

600

METHOD AND APPARATUS FOR PROVIDING LOCALLY RELEVANT REROUTING INFORMATION

BACKGROUND

Conventional navigation system does not report spontaneous traffic events that impact the traffic flow in a road segment for a short period of time. Hence, users find themselves in a congested traffic area, and are slowed down by the heavy traffic resulting from that sudden traffic event which was never reported. As a result, service providers and device manufacturers (e.g., wireless, cellular, etc.) are continually challenged to deliver value and convenience to consumers by, for example, providing a service that notifies users and/or vehicles in a dynamic manner regarding blocking elements that momentarily obstructs traffic flow in a road segment.

SOME EXAMPLE EMBODIMENTS

Therefore, there is a need for an approach for providing navigation information based on traffic information for a geographic coverage area.

According to one embodiment, a method comprises determining traffic information for at least one geographic coverage area associated with at least one wireless communication access point. The method also comprises aggregating the traffic information in the at least one wireless communication access point. The method further comprises determining navigation information based, at least in part, on the traffic information, wherein the navigation information, the traffic information, or a combination thereof is transmitted from the at least one wireless communication access point to one or more devices within the at least one geographic area.

According to another embodiment, an apparatus comprises at least one processor, and at least one memory including computer program code for one or more computer programs, the at least one memory and the computer program code configured to, with the at least one processor, cause, at least in part, the apparatus to determine traffic information for at least one geographic coverage area associated with at least one wireless communication access point. The apparatus is also caused to aggregate the traffic information in the at least one wireless communication access point. The apparatus is further caused to determine navigation information based, at least in part, on the traffic information, wherein the navigation information, the traffic information, or a combination thereof is transmitted from the at least one wireless communication access point to one or more devices within the at least one geographic area.

According to another embodiment, a computer-readable storage medium carries one or more sequences of one or more instructions which, when executed by one or more processors, cause, at least in part, an apparatus to determine traffic information for at least one geographic coverage area associated with at least one wireless communication access point. The apparatus is also caused to aggregate the traffic information in the at least one wireless communication access point. The apparatus is further caused to determine navigation information based, at least in part, on the traffic information, wherein the navigation information, the traffic information, or a combination thereof is transmitted from the at least one wireless communication access point to one or more devices within the at least one geographic area.

According to another embodiment, an apparatus comprises means for determining traffic information for at least one geographic coverage area associated with at least one wireless communication access point. The apparatus also comprises means for aggregating the traffic information in the at least one wireless communication access point. The apparatus further comprises means for determining navigation information based, at least in part, on the traffic information, wherein the navigation information, the traffic information, or a combination thereof is transmitted from the at least one wireless communication access point to one or more devices within the at least one geographic area.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48. Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing navigation based on traffic information for a geographic coverage area are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to a wireless communication access point, it is contemplated that the wireless communication access point may be applicable to various base stations.

FIG. 1 is a diagram of a system capable of providing navigation information based on traffic information for a geographic coverage area, according to one embodiment. It is difficult for users travelling in a particular route segment to be aware of sudden and/or short-term event occurrences that obstruct the traffic flow (e.g., a broken car, a moving truck parked in a manner that partially blocks the street, accident, etc.). As a result, the user ends up slowed down by the congested traffic. Most users may opt for an alternate route had they known that their chosen route is obstructed by a short-term event occurrences. However, timely traffic information updates must reaches the users before they find themselves in an influenced area, e.g., in a high traffic area. Therefore, there is a need for a system that alerts drivers and/or vehicles on one or more blocking elements in a road segment in a dynamic manner so that a user can take a corrective action in a timely manner.

To address this problem, system 100 of FIG. 1 introduces the capability to provide traffic updates, such as short-term traffic updates (e.g., a stopped delivery truck, a garbage collector blocking a street by going through each house, etc.) that are not typically reported by the traffic systems. In one scenario, the system 100 alerts users of one or more vehicles on sudden blocking elements in a road segment (e.g., a moving truck partially blocking a street) in a dynamic manner, thereby reducing the latency of such traffic related disruptions. Further, system 100 uses map related information stored in the one or more wireless communication access points, hence the response time to get map data decreases. This results in one or more user devices receiving routing information, navigation information, road/street section related status information, and/or traffic related events at faster rates as compared to typical traffic services.

Figure 1A:
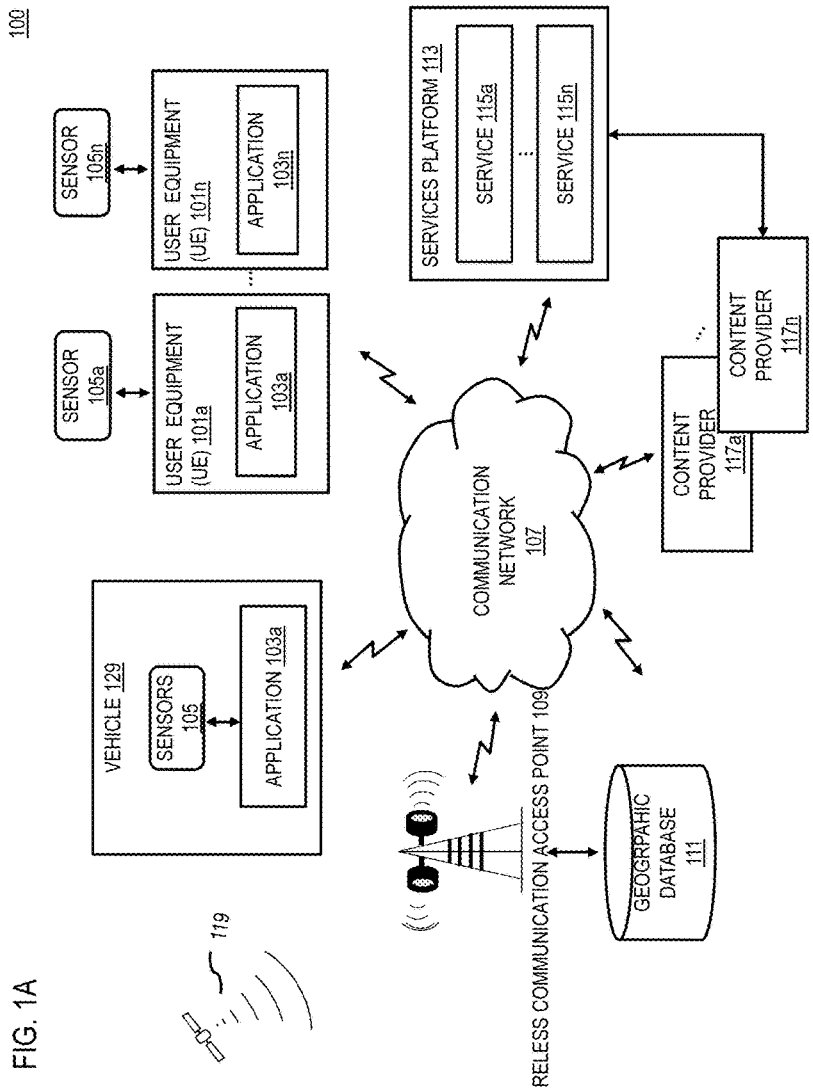
FIG. 1A is a diagram of a system capable of providing navigation information based on traffic information for a geographic coverage area, according to one example embodiment.

As shown in FIG. 1A, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to a wireless communication access point 109, e.g., a wireless communication base station, via a communication network 107, e.g., a wireless communication network. In one embodiment, the wireless communication access point 109 performs one or more functions associated with providing navigation information based on traffic information for a geographic coverage area.

As shown in FIG. 1A, the system 100 comprises of UE 101. In one embodiment, the UE 101 may include, but is not restricted to, any type of a mobile terminal, wireless terminal, fixed terminal, or portable terminal. Examples of the UE 101, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In one embodiment, the UE 101 may support any type of interface for supporting the presentment of one or more recommended routes towards at least one destination. In addition, the UE 101 may facilitate various input means for receiving and generating information, including, but not restricted to, a touch screen capability, a keyboard and keypad data entry, a voice-based input mechanism, and the like. Any known and future implementations of the UE 101 may also be applicable. In one embodiment, the UE 101 may be included, embedded within, or communicatively connected to the one or more vehicles (e.g., vehicle 129). In one embodiment, the at least one or more vehicles 129 includes at least one autonomous vehicle, at least one highly-assisted driving vehicle, or a combination thereof.

The UE 101 may further include applications 103. Further, the applications 103 may include various applications such as, but not restricted to, location-based service application, navigation application, content provisioning application, camera/imaging application, media player application, social networking application, calendar applications, multimedia application, and the like. In one embodiment, the applications 103 are installed within the UE 101. In one example embodiment, a location-based service application installed in the UE 101 enables the wireless communication access point 109 to determine, for example, position, destination, heading, speed, context, identification, type, or any combination thereof, for one or more of the UE 101, such as, vehicles. In another embodiment, the camera/imaging application installed in the UE 101 enables the wireless communication access point 109 to determine the status situation in one or more road segments, such as traffic or weather.

The system 100 also includes one or more sensors 105, which can be implemented, embedded or communicatively connected to the UE 101 and/or vehicle 129. The sensors 105 may be any type of sensor. In certain embodiments, the sensors 105 may include, for example, but not restricted to, a global positioning sensor for gathering location data, such as a Global Navigation Satellite System (GNSS) sensor, Light Detection And Ranging (LIDAR) for gathering distance data, a network detection sensor for detecting wireless signals or receivers for different short-range communications (e.g., Bluetooth, Wi-Fi, Li-Fi, Near Field Communication (NFC) etc.), temporal information sensors, a camera/imaging sensor for gathering image data (e.g., the camera sensors may automatically capture traffic flow information and/or traffic light information for analysis purpose), and the like. In another embodiment, the sensors 105 may include light sensors, oriental sensors augmented with height sensor and acceleration sensor (e.g., an accelerometer can measure acceleration and can be used to determine orientation of the UE 101), tilt sensors, e.g., gyroscopes, to detect the degree of incline or decline of the vehicle along a path of travel, an electronic compass to detect a compass direction, moisture sensors, pressure sensors, etc. In a further example embodiment, sensors about the perimeter of the vehicle may detect the relative distance of the vehicle from lane or roadways, the presence of other vehicles, pedestrians, traffic lights, potholes and any other objects, or a combination thereof. In one scenario, the sensors 105 may detect weather data, road condition (e.g., icy road, gravel road), traffic information, or a combination thereof. In one example embodiment, the UE 101 may include Global Positioning System (GPS) receivers to obtain geographic coordinates from satellites 119 for determining current location and time associated with the UE 101. Further, the location can be determined by an Assisted Global Positioning (A-GPS), Cell of Origin, a wireless signal triangulation system, or other location extrapolation technologies. In another example embodiment, the one or more sensors may provide in-vehicle navigation services, wherein one or more location based services may be provided to the at least one UE 101 associated with the at least one user of the vehicle and/or at least one other UE 101 associated with the at least one vehicle. In one example embodiment, the one or more sensors 105 in the UE 101 or vehicle 129 enable determination, for example, position, destination, speed, type and identification, or any combination thereof, for the UE 101 or vehicle 129. In another embodiment, the one or more sensors 105 enable determination of the status situation in one or more road segments, such as, traffic or weather. In another embodiment, the one or more sensors 105 enable determination of context of the UE 101 or vehicle 129.

Further, various elements of the system 100 may communicate with each other through a communication network 107. The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), vehicle controller area network (CAN bus), and the like, or any combination thereof.

In one embodiment, the wireless communication access point 109 may be a platform with multiple interconnected components. The wireless communication access point 109 may include one or more servers, intelligent networking devices, computing devices, components and corresponding software for providing navigation information based on traffic information for a geographic coverage area. In addition, it is noted that the wireless communication access point 109 may be a separate entity of the system 100, a part of the one or more services 115a-115n (collectively referred to as services 115) of the services platform 113, or the UE 101.

In one embodiment, the wireless communication access point 109 may determine traffic information for at least one geographic coverage area. In another embodiment, the wireless communication access point 109 may provide local feed of traffic related information at base station level. In one scenario, the at least one wireless communication access point 109 may comprise a base transceiver station (BTS) and/or base station controller (BSC), that facilitates wireless communication between a UE 101 and a network. The wireless communication access point 109 may include/store, for example, a local map data, local event data, local traffic data, local weather data, local routing engine/application, local navigation engine/application, or any combination thereof. In one scenario, the locality relates to the wireless communication coverage area, e.g., a cellular area, of the wireless communication access point 109. Additionally, the wireless communication access point 109 may have access to related global/general data sources.

In one embodiment, the wireless communication access point 109 may cause, at least in part, an aggregation of the traffic information. In one scenario, the wireless communication access point 109 may receive position information, destination information, traffic information, weather information, road/street condition information, context information, or a combination thereof from one or more sensors 105 and/or one or more connected vehicles. The wireless communication access point 109 may process the collected information (e.g., position information, destination information, traffic information, etc.) to determine at least one obstruction, in real-time, or substantially real-time, at the at least one route segment. In one example embodiment, the wireless communication access point 109 may cause a real-time vehicle analysis combined with historical data over a small dedicated area (e.g., the cellular cell). Then, the wireless communication access point 109 may digest and compute the most relevant data for the dedicated area.

In one embodiment, the wireless communication access point 109 may determine navigation information based, at least in part, on the traffic information. The navigation information, the traffic information, or a combination thereof is transmitted from the at least one wireless communication access point (e.g., base station) to one or more devices, e.g., the UE 101 or vehicle 129, within the at least one geographic area, e.g., the local area or wireless communication coverage area. In one scenario, the wireless communication access point 109 may calculate at least one alternative route, in some scenario in real-time or substantially real-time, based, at least in part, on the obstruction. The wireless communication access point 109 may directly provide a new detour around a blocked area instead of just providing raw information that the area is blocked. In another scenario, the wireless communication access point 109 may cause or instruct a presentation of at least one notification of the at least one alternative route, at least one route to avoid, or a combination thereof. The wireless communication access point 109 may compute all alternative routes at base station level, thereby increasing the speed of getting new routes if the user does not follow the originally proposed route. In such manner, the wireless communication access point 109 allows users to make timely decisions on the road by well-timed notification of alternative routes.

In one embodiment, the geographic database 111 may store and manage local map data, local event database, local traffic data (raw, statistical, etc.), weather data, or a combination thereof. In another embodiment, the geographic database 111 may store traffic information for one or more route segments (e.g., traffic density information), attributes for one or more road segments (e.g., road signage information, traffic signal information, traffic speed information, etc.). The information may be any multiple types of information that can provide means for aiding in the content provisioning and sharing process.

The services platform 113 may include any type of service. By way of example, the services platform 113 may include mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, etc. In one embodiment, the services platform 113 may interact with the UE 101, the wireless communication access point 109 and the content provider 117 to supplement or aid in the processing of the content information. In one embodiment, the services platform 113 may be implemented or embedded in the wireless communication access point 109 or in its functions.

By way of example, the services 115 may be an online service that reflects interests and/or activities of users. The services 115 allow users to share location information, activities information, contextual information, historical user information and interests within their individual networks, and provides for data portability. The services 115 may additionally assist in providing the wireless communication access point 109 with information on travel plans of at least one user, activity information of at least one user, speed information for at least one user, user profile information, and a variety of additional information.

The content providers 117a-117n (collectively referred to as content provider 117) may provide content to the UE 101, the vehicle 129, the wireless communication access point 109, and the services 115 of the services platform 113. The content provided may be any type of content, such as, image content (e.g., pictures of accidents, traffic lights, etc.), textual content (e.g., traffic flow information, speed information, etc.), audio content (e.g., audio notification), video content (e.g., visual notification), etc. In one embodiment, the content provider 117 may provide content that may supplement content of the applications 103, the sensors 105, or a combination thereof. In one embodiment, the content provider 117 may provide or supplement the mapping services/application, navigation services/application, travel planning services/application, route calculation services/application, notification services/application, social networking services/application, content (e.g., audio, video, images, etc.) provisioning services/application, application services/application, storage services/application, contextual information determination services/application, location based services/application, information (e.g., weather, news, etc.) based services/application, local map data, or any combination thereof. By way of example, the content provider 117 may provide content that may aid in presenting real-time traffic information for at least route. In one embodiment, the content provider 117 may also store content associated with the UE 101, the wireless communication access point 109, and the services 115 of the services platform 113. In another embodiment, the content provider 117 may manage access to a central repository of data, and offer a consistent, standard interface to data, such as, a repository of traffic information for one or more routes, one or more maps, attributes for one or more road segments, traffic signal information, speed limit information in at least one road segment, or a combination thereof. Any known or still developing methods, techniques or processes for presenting comprehensible representation of traffic information for at least one route may be employed by the wireless communication access point 109.

By way of example, the UE 101, the wireless communication access point 109 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. In one scenario, the communication between the vehicle/UE 101 and the wireless communication access point happen over normal cellular telecommunication methods/technologies.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
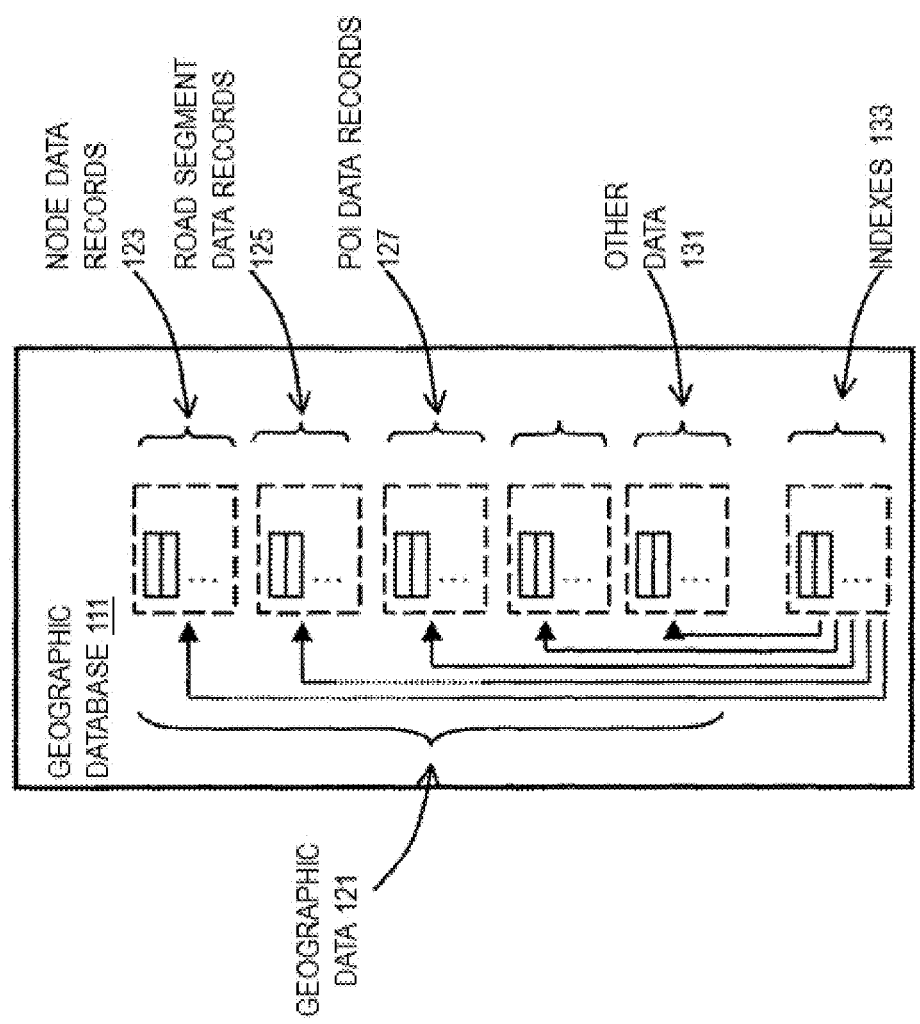
FIG. 1B is a diagram of the geographic database 111 of system 100, according to example embodiments.

FIG. 1B is a diagram of the geographic database 111 of system 100, according to example embodiments. In the exemplary embodiments, point of interests (POIs) and map generated POIs data can be stored, associated with, and/or linked to the geographic database 111 or data thereof. In one embodiment, the geographic or map database 111 includes geographic data 121 used for (or configured to be compiled to be used for) mapping and/or navigation-related services, such as for personalized route determination, according to exemplary embodiments. For example, the geographic database 111 includes node data records 123, road segment or link data records 125, POI data records 127, and other data records 131, for example. More, fewer or different data records can be provided. In one embodiment, the other data records 131 include cartographic ("carto") data records, routing data, traffic signal data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the geographic database 111 may store probe data received over time from one or more vehicles in one or more road segments. The wireless communication access point 109 may analyze the probe data to determine at least one route segment. In one scenario, the probe data may include a set of information pertaining to vehicle movements (e.g., vehicle speed information) with time-stamped geographic locations. In one example embodiment, a UE 101 (e.g., UE 101 associated with at least one vehicle, smart vehicles, etc.) may transmit probe data (e.g., speed information) via sensors 105 in real-time, as per schedule, as per request, or a combination thereof. The wireless communication access point 109 may collect probe data from devices associated with one or more users, one or more vehicles, or a combination thereof that are in motion. These probe data may be assembled into trajectories that provide a data description regarding movements of one or more vehicles.

In exemplary embodiments, the road segment data records 125 are links or segments representing roads, streets, parking areas, or paths, as can be used in the calculated route or recorded route information for determination of one or more personalized routes, according to exemplary embodiments. The node data records 123 are end points corresponding to the respective links or segments of the road segment data records 125. The road link data records 125 and the node data records 123 represent a road network, such as used by vehicles, cars, and/or other entities. Alternatively, the geographic database 111 can contain path segment and node data records or other data that represent pedestrian paths or areas in addition to or instead of the vehicle road record data, for example.

The road link and nodes can be associated with attributes, such as geographic coordinates, traffic lights, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, parking areas (attributes on which parking areas are critical) etc. The geographic database 111 can include data about the POIs and their respective locations in the POI data records 127. The geographic database 111 can also include data about places, such as cities, towns, or other communities, and other geographic features, such as bodies of water, mountain ranges, etc. Such place or feature data can be part of the POI data 127 or can be associated with POIs or POI data records 127 (such as a data point used for displaying or representing a position of a city). By way of example, a street is determined from the user interaction with the UE 101 and the content information associated with the UE 101, according to the various embodiments described herein.

The geographic database 111 can be maintained by the content provider in association with the services platform 113 (e.g., a map developer). The map developer can collect geographic data to generate and enhance the geographic database 111. There can be different ways used by the map developer to collect data. These ways can include obtaining data from other sources, such as municipalities or respective geographic authorities (e.g., schedules for traffic light signals). In addition, the map developer can employ field personnel to travel by vehicle along roads throughout the geographic region to observe features and/or record information about them, for example. Also, remote sensing, such as aerial or satellite photography, can be used.

The geographic database 111 can be a master geographic database stored in a format that facilitates updating, maintenance, and development. For example, the master geographic database 111 or data in the master geographic database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 111 can be a master geographic database, but in alternate embodiments, the geographic database 111 can represent a compiled navigation database that can be used in or with end user devices (e.g., UEs 101) to provided navigation-related functions. For example, the geographic database 111 can be used with the UE 101 to provide an end user with navigation features. In such a case, the geographic database 111 can be downloaded or stored on the UE 101, such as in the applications 103, or the UE 101 can access the geographic database 111 through a wireless or wired connection (such as via a server and/or the communication network 107), for example.

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the navigation device UE 101 can be a cellular telephone. An end user can use the device UE 101 for navigation functions, for example, mixed mode traffic map display for travelling in a route with minimal possibility of obstructions (e.g., less traffic congestion, etc.).

Figure 2:
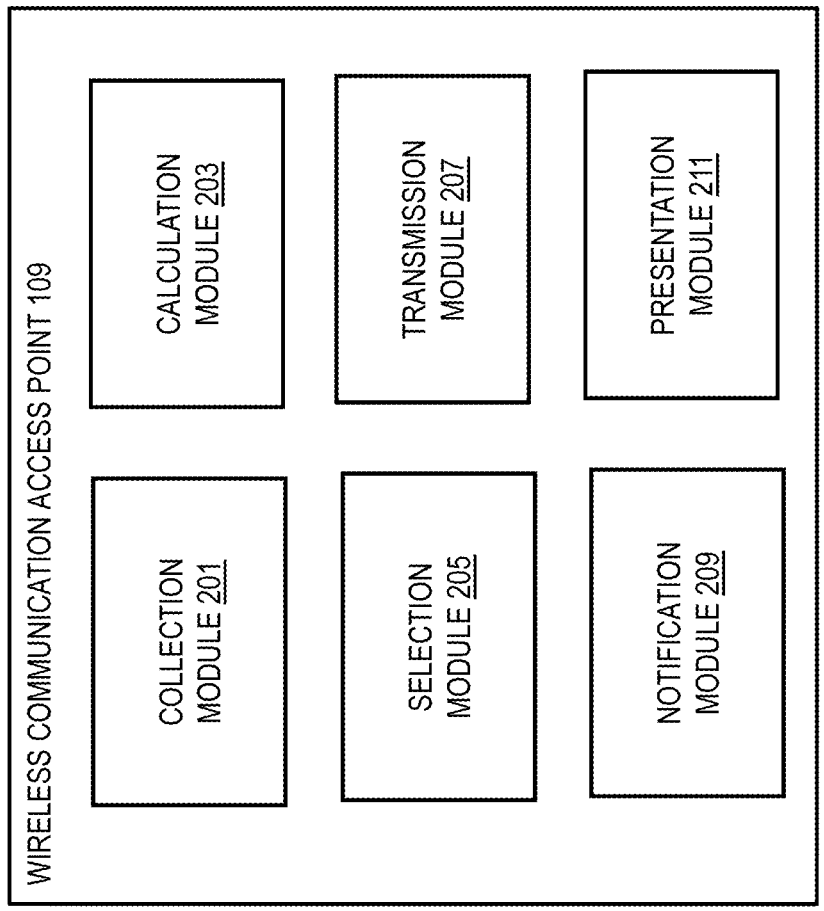
FIG. 2 is a diagram of the components of the wireless communication access point 109, according to one example embodiment.

FIG. 2 is a diagram of the components of the wireless communication access point 109, according to one example embodiment. By way of example, the wireless communication access point 109 includes one or more components for providing navigation information based e.g., on traffic information for a geographic coverage area. It is contemplated that the functions of these components may be combined in one or more components or performed by other components of equivalent functionality. In one embodiment, the wireless communication access point 109 comprises one or more collection modules 201, calculation modules 203, selection modules 205, transmission modules 207, notification modules 209, and presentation modules 211, or any combination thereof. In one scenario, the modules 201-211 can be implemented using Edge computing technology principle at the wireless communication access point 109.

In one embodiment, the collection module 201 receives position information, destination information, traffic information, context information, speed information, direction information, or a combination thereof from one or more sensors 105 from one or more connected UEs and/or vehicles. In another embodiment, the collection module 201 receives status information for at least one traffic signal, weather information, event information, one or more attributes associated with the at least one route/street segment, or a combination thereof from various sources (e.g., databases). The collection module 201 may provide the gathered data to the calculation module 203.

In one embodiment, the calculation module 203, e.g., a route calculation module, may select the most relevant data from the collection module 201 to calculate at least one alternative route in case some road/street segments are affected by traffic incidents. In one scenario, the calculation module 203 may compute an alternative route locally by matching the final destination, or a local destination within its area of map information, for at least one vehicle with its area of map information. Then, the calculation module 203 determines traffic incidents on the related sub-routes to select at least one sub-route. In another embodiment, the calculation module 203 may receive position information and/or direction information for at least one vehicle in the at least one route segment. Then, the calculation module 203 may calculate at least one anticipated destination based, at least in part, on the local event data, user profile information, historical information, or a combination thereof. In one scenario, it is possible that the calculation module can determine no traffic incidents or events on its area of the map information.

In one embodiment, the selection module 205 may select at least one wireless communication access point for the at least one route segment based, at least in part, on the vehicle 129 or the UE 101 related information, location parameters, capability information, or a combination thereof. In one scenario, the vehicle or the UE related information includes position information, destination information, direction information, the vehicle and/or UE identification information, such as an International Mobile Station Equipment Identity (IMEI), International Mobile Subscriber Identity (IMSI), Mobile Subscriber ISDN Number (MSISDN), Vehicle Identification Number (VIN), or a combination thereof. In another scenario, the location parameters may represent geographic coverage area for at least one wireless communication access point (e.g., base station). In a further scenario, the capability information may represent the range information for at least one wireless communication access point.

In one embodiment, the transmission module 207 may transmit the vehicle 129 or UE 101 related information, anticipated destination, relevant traffic information, heading information, vehicle or UE type information, or a combination thereof from the at least one wireless communication access point to one or more other wireless communication access points. In one scenario, the transmission of information can happen as part of wireless communication access point handover signaling and/or management. In one scenario, the vehicle or the UE receives traffic updates and/or routing information from a nearby wireless communication access point, e.g., the base station to which it is communicatively connected. As the vehicle travels through multiple wireless communication access points the ongoing data session from one connected wireless communication access point is transferred to the other wireless communication access point. Accordingly, vehicle receives new traffic updates and/or routing information from a specific wireless communication access point to which it is communicatively connected. This sequence of handing over data session from one wireless communication access point to another wireless communication access point creates navigation instructions for the whole route. In an additional embodiment, the wireless communication access points may provide navigation guidance as the sequence of mini-maps to the one or more UE and/or the one or more vehicles. In an alternative embodiment, when the vehicle or the UE travels through multiple wireless communication access points, the transmission module 207 transfers the ongoing data session from the connected wireless communication access point to the other wireless communication access point after the handover between the wireless communication access points is completed.

In one embodiment, the notification module 209 may cause a notification of at least one event, e.g., an obstruction, in a road segment in one or more devices associated with at least one user and/or at least one vehicle. The notification may be in the form of a visual alert, an audio alert, a vibration, or a combination thereof. In one scenario, the notification may be based, at least in part, on acceleration information of at least one vehicle. Further, the one or more notifications may be adapted with user preferences and tolerances, which, in part, provide a personalized modification of the notification system. In one scenario, if the calculation module 203 determines no traffic incidents or other events on its coverage area of the map information, the related notification/message can be a silent OK acknowledgement to the vehicle or the UE, and/or a navigation application in the vehicle or the UE. In an additional use case, the OK acknowledgement can also be rendered in the vehicle or the UE in the form of a visual alert, an audio alert, a vibration, or a combination thereof.

In one embodiment, the presentation module 211 obtains information and/or updates from the other modules, e.g., from the notification module 209. Then, the presentation module 211 continues with generating a presentation of at least one notification, at least one alternative route and/or at least one avoidable road segment. In one scenario, the presentation include an image overlay of the at least one alternative route or a map presentation, e.g., an image, with the at least one alternative route or detour. In another scenario, the presentation may incorporate obstruction information (road constructions, road accidents), temporal information (e.g., estimated time of arrival), traffic density information (e.g., number of vehicles nearby), the OK acknowledgement, etc. or any combination thereof. In one scenario, the presentation module 211 may receive specific maneuver instructions and/or audio commands from the transmission module 207. Then, the presentation module 211 may provide audio and/or video presentation of at least one alternative route in at least one UE 101. In one example embodiment, the presentation module 211 may present routing instruction towards at least one destination in a mapping format and/or textual format (e.g., script) in at least one device associated with at least one vehicle. The routing instruction may include obstruction information, maneuver instructions, vehicular position information, and so on. In another scenario, the presentation module 211 may present one or more obstructions as heat maps. The heat maps may present areas to be avoided and/or obstruction information when vehicles are travelling inside a geo-area of at least one wireless communication access point and the wireless communication access point does not know the final destination for the vehicles. The heat maps may be presented as an overlay to internal navigation systems. Further, the heat maps may be provided as non-graphical information with single points and weights towards obstructions (e.g., as a grid). Each grid point may be assigned a weight (e.g., similar to a magnet pushing another magnet away), and may be used by a navigation system as "anti-magnetic" waypoint (i.e., try to avoid this area). In a further scenario, the presentation module 211 may provide colored presentation of at least one road segment where parking and/or stopping is not allowed. For example, the presentation module 211 may present a road segment as 'red' denoting that stopping is temporarily not allowed.

The above presented modules and components of the wireless communication access point 109 can be implemented in hardware, firmware, software, or a combination thereof. Though depicted as a separate entity in FIG. 1, it is contemplated that the wireless communication access point 109 may be implemented for direct operation by respective UE 101. As such, the wireless communication access point 109 may generate direct signal inputs by way of the operating system of the UE 101 for interacting with the applications 103. In another embodiment, one or more of the modules 201-211 may be implemented for operation by respective UEs, as the wireless communication access point 109, or combination thereof. Still further, the wireless communication access point 109 may be integrated for direct operation with the services 115, such as in the form of a widget or applet, in accordance with an information and/or subscriber sharing arrangement. The various executions presented herein contemplate any and all arrangements and models.

Figure 3:
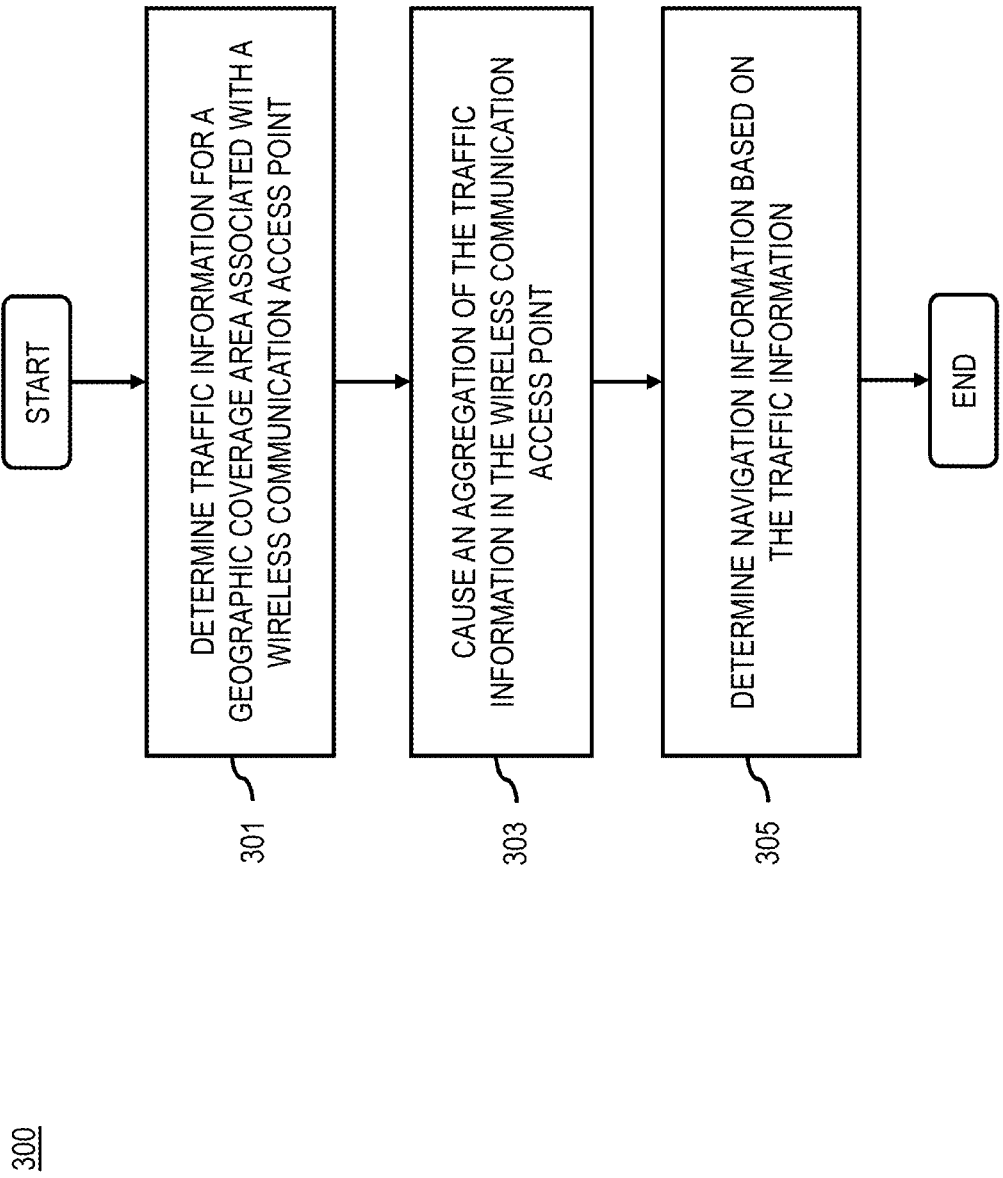
FIG. 3 is a flowchart of a process for providing navigation information based on traffic information for a geographic coverage area, according to one example embodiment.
Figure 12:
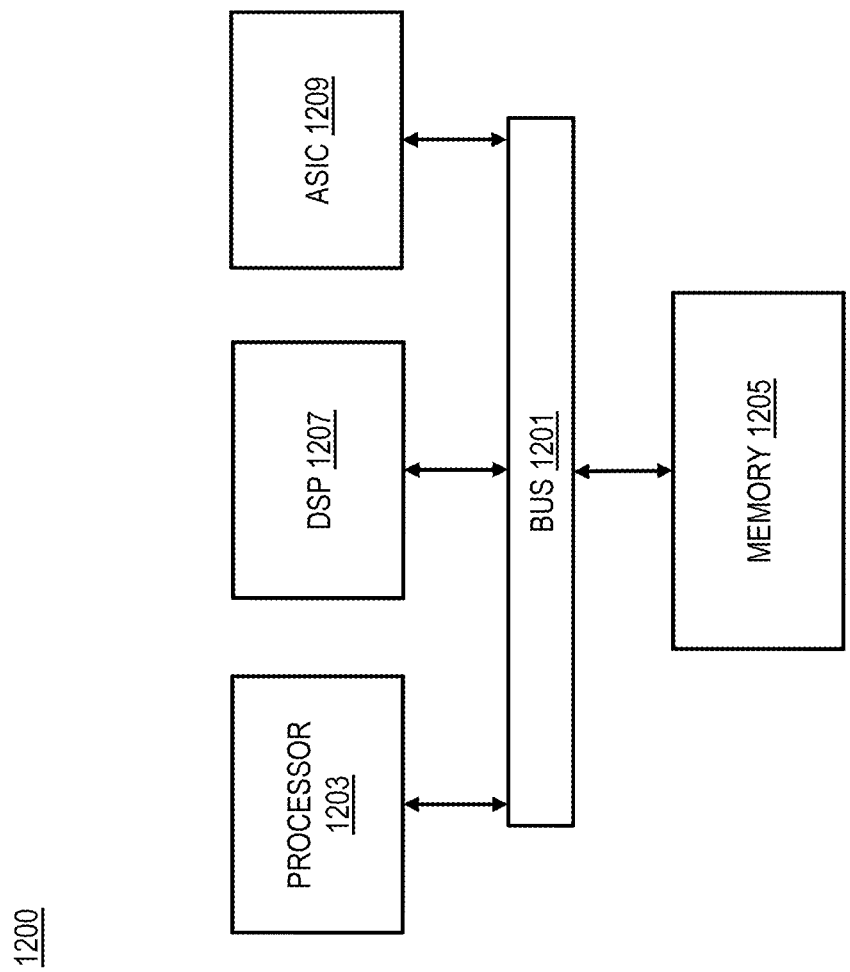
FIG. 12 is an example diagram of a chip set that can be used to implement an embodiment of the invention.

FIG. 3 is a flowchart of a process for navigation information based on traffic information for a geographic coverage area, according to one example embodiment. In one embodiment, the wireless communication access point 109 performs the process 300 and is implemented in, for instance, a chip set including a processor and a memory as shown in FIG. 12.

In step 301, the wireless communication access point 109 may determine traffic information for at least one geographic coverage area associated with at least one wireless communication access point. In one scenario, one or more vehicles before entering any road segments or making any maneuvers on the at least one geographic coverage may check with the closest wireless communication access point (e.g., base station), or with the wireless communication access point to which they are communicatively connected, whether the traffic flow on the next road segment on the area, on a specific route on the area, or on any road segment on the area, is fluent or not. The one or more vehicles and/or the associated UE 101 may provide the wireless communication access point 109 with position information, direction information, identification information, and/or destination information, or any combination thereof. In another scenario, the wireless communication access point 109 may receive traffic information from one or more other UE 101 and/or one or more other connected vehicles regarding at least one route segment within its coverage area.

In step 303, the wireless communication access point 109 may aggregate the traffic information in the at least one wireless communication access point. In one scenario, the wireless communication access point 109 may collect traffic information within its coverage area. Then, the wireless communication access point 109 may match the final destination or the direction information for the one or more vehicles with the collected traffic information within its coverage area to determine a related sub-route within the at least one geographic coverage area associated with at least one wireless communication access point. In one scenario, at least one route towards a final destination includes multiple sub-routes. The wireless communication access point 109 may select at least one sub-route based on traffic information.

In step 305, the wireless communication access point 109 may determine navigation information based, at least in part, on the traffic information. In one embodiment, the navigation information, the traffic information, the event information, or a combination thereof is transmitted from the at least one wireless communication access point to one or more devices 101 or 129 within the at least one geographic area. In another embodiment, the navigation information provided by the at least one wireless communication access point, the one or more other wireless communication access points, or a combination thereof comprise at least one complete set of navigation guidance instructions for the at least one route. In a further embodiment, the wireless communication access point 109 may use the Edge computing technology to propose new alternative routes to one or more users, i.e., the wireless communication access point 109 may compute a new route locally at the base station level. Then, the wireless communication access point 109 may present the new routes as an image overlay of the detour (with detour and blockages highlighted). In addition, the wireless communication access point 109 may also present road links to avoid based, at least in part, on the blocked road segment.

Figure 4:
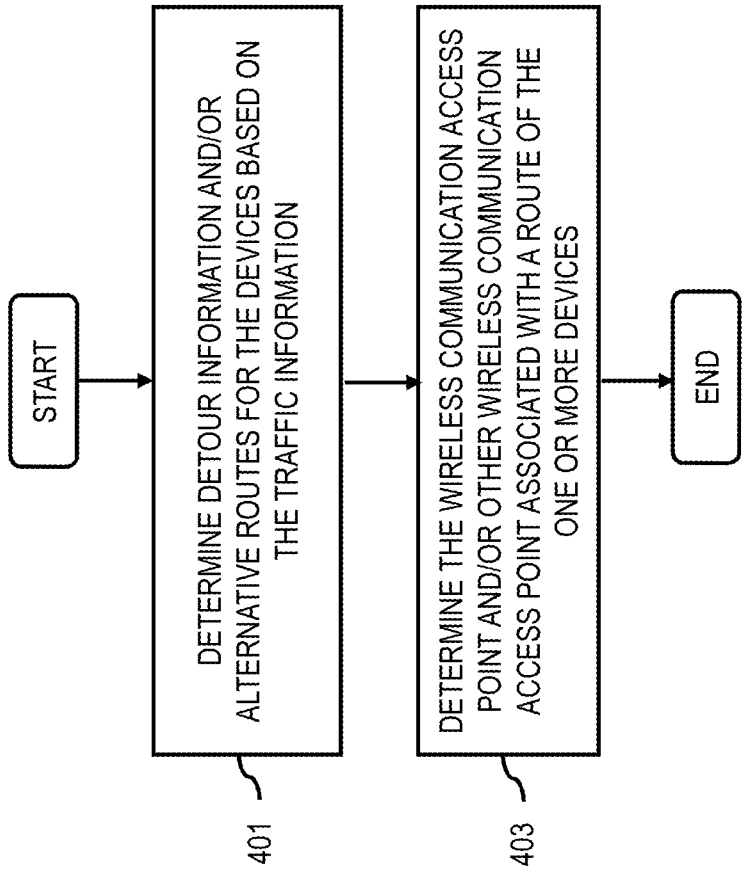
FIG. 4 is a flowchart of a process for selecting at least one wireless communication access point associated with at least one determined alternative route, according to one example embodiment.

FIG. 4 is a flowchart of a process for selecting at least one wireless communication access point associated with at least one determined alternative route, according to one example embodiment. In one embodiment, the wireless communication access point 109 performs the process 400 and is implemented in, for instance, a chip set including a processor and a memory as shown in FIG. 12.

In step 401, the wireless communication access point 109 may determine detour information, one or more alternative routes, or a combination thereof for the one or more devices based, at least in part, on the traffic information. In one embodiment, the navigation information includes, at least in part, the detour information, the one or more alternative routes, or a combination thereof. In one scenario, the wireless communication access point 109 may determine detour information around at least one obstruction in a road segment, and may navigate a user back to the original route. In another scenario, the wireless communication access point 109 may determine an alternative route based, at least in part, on the obstruction. In one example embodiment, the wireless communication access point 109 may provide navigation guidance as a sequence of mini-maps to the one or more UE 101 and/or the one or more vehicles. In one example embodiment, one or more users may subscribe to an audio and/or visual multimedia playback (may be realized through a server-side-event). Then, the wireless communication access point 109 may push the required information to at least one device associated with a vehicle based, at least in part, on vehicular position, predicted movement, or a combination thereof. Additional services like audio output could be delivered through Edge computing, and any known or still developing methods, techniques or processes.

In step 403, the wireless communication access point 109 may determine the at least one wireless communication access point, one or more other wireless communication access points, or a combination thereof associated with at least one route of the one or more devices. In one embodiment, the at least one wireless communication access point, the one or more other wireless communication access points, or a combination thereof provide the navigation information, the traffic information, or a combination thereof for the at least geographic coverage area, one or more other geographic coverage areas associated with the one or more other wireless communication access points, or combination thereof as the one or more devices travel the at least one route. In one scenario, at least one wireless communication access point may be determined based, at least in part, on position of at least one vehicle or UE, direction of at least one vehicle, destination of at least one vehicle, distance parameters, sensors capability, vehicle or UE type information, historical navigation or route data of the at least one vehicle that may be stored in the wireless communication access point with the vehicle or the UE identification, etc. In one example embodiment, a possible way for one or more users and/or vehicles to ensure that they do not get stuck behind a stopped vehicle is for the user and/or the vehicle to check with the closest wireless communication access point on the fluency of the traffic flow. Basically, the users and/or vehicles are requesting signals from the at least one wireless communication access point that a route is clear before entering or making any maneuver.

Figure 5:
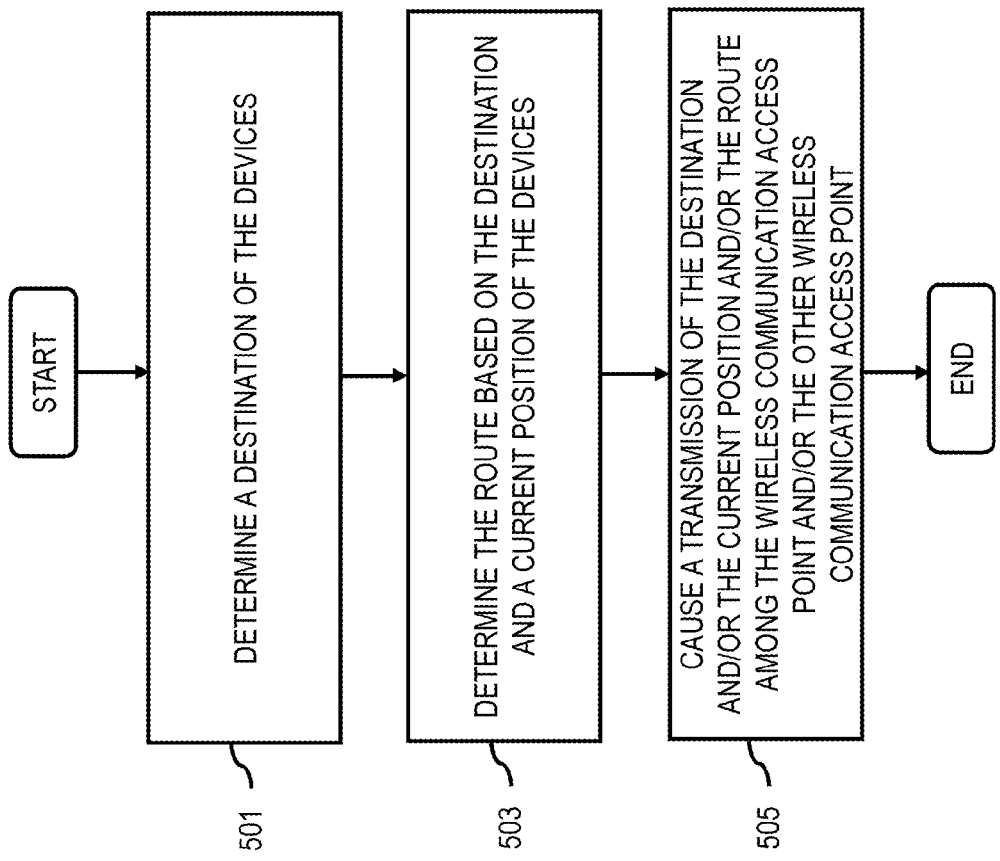
FIG. 5 is a flowchart of a process for determining at least one route towards a destination and transmitting the at least one route amongst multitude of wireless communication access points, according to one example embodiment.

FIG. 5 is a flowchart of a process for determining at least one route towards a destination and transmitting the at least one route amongst multitude of wireless communication access points, according to one example embodiment. In one embodiment, the wireless communication access point 109 performs the process 500 and is implemented in, for instance, a chip set including a processor and a memory as shown in FIG. 12.

In step 501, the wireless communication access point 109 may determine at least one destination of the one or more devices. In one scenario, the wireless communication access point 109 may process position information, optionally also direction information, of at least one device to anticipate its destination. The wireless communication access point 109 may take into consideration local event data, user profile information, historical information of the device, or a combination thereof while anticipating a destination.

In step 503, the wireless communication access point 109 may determine the at least one route based, at least in part, on the at least one destination, at least one current position, and at least one current heading information of the one or more devices.

In step 505, the wireless communication access point 109 may cause, at least in part, a transmission of the at least one destination, the at least one current position, the at least one route among the at least one wireless communication access point, the one or more other wireless communication access points, or a combination thereof based, at least in part, on the at least one route, the traffic information, the navigation information, contextual information about the one or more devices, other contextual information associated with one or more vehicles associated with the one or more devices, or a combination thereof. In one scenario, similar to cellular handovers, the anticipated trajectory is computed by the wireless communication access point 109 and requests are made to the neighboring wireless communication access points. The provided navigation related information goes beyond the current wireless communication access point to ensure smooth handovers. The navigation information may include but is not limited to position information, heading information, range information, route information, destination information, next waypoint on the previously calculated route, or a combination thereof. In one scenario, handover between wireless communication access points happens over a normal cellular telecommunication methods/technologies.

Figure 6:
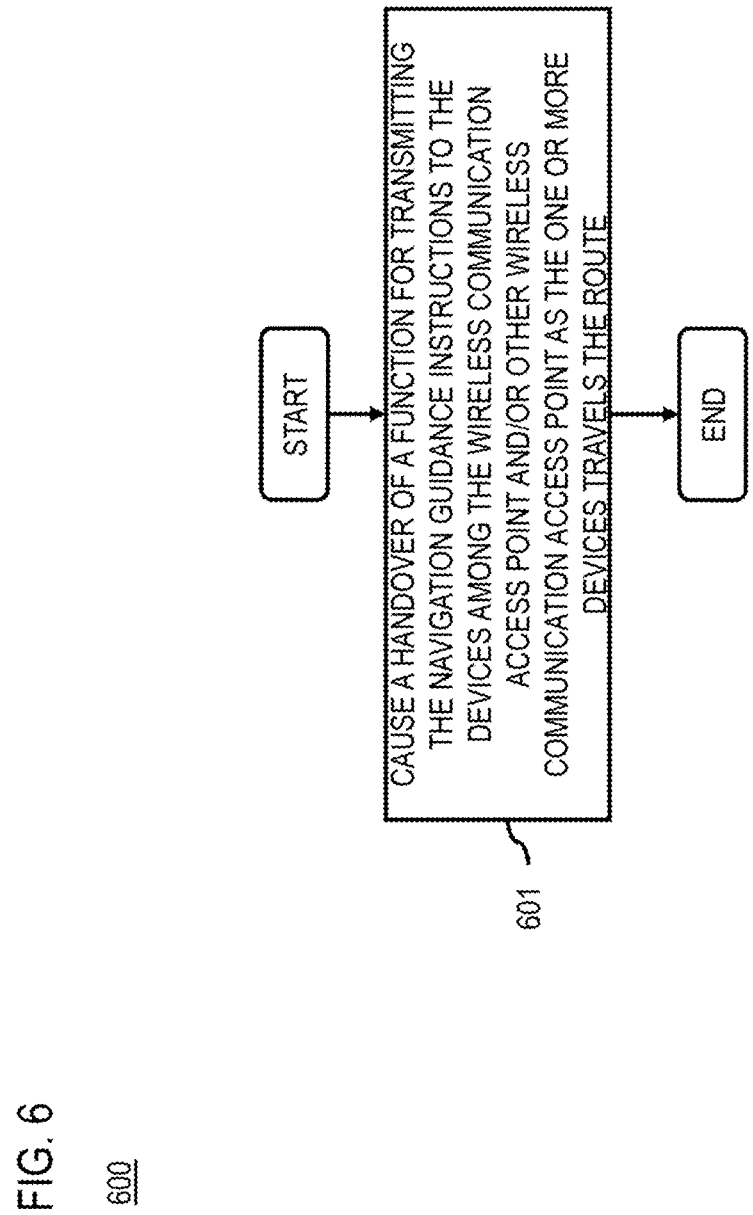
FIG. 6 is a flowchart of a process for transmitting navigation guidance instructions from at least one wireless communication access point to at least one other wireless communication access point, according to one example embodiment.

FIG. 6 is a flowchart of a process for transmitting navigation guidance instructions from at least one wireless communication access point to at least one other wireless communication access point, according to one example embodiment. In one embodiment, the wireless communication access point 109 performs the process 600 and is implemented in, for instance, a chip set including a processor and a memory as shown in FIG. 12.

In step 601, the wireless communication access point 109 may cause, at least in part, a handover of a function for transmitting the navigation guidance instructions to the one or more devices among the at least one wireless communication access point, the one or more other wireless communication access points, or a combination thereof as the one or more devices travels the at least one route. In one scenario, the wireless communication access point 109 may manage and pass navigation information from at least one wireless communication access point to at least one other wireless communication access point as the vehicle progresses along the route segment towards its final destination.

Figure 7:
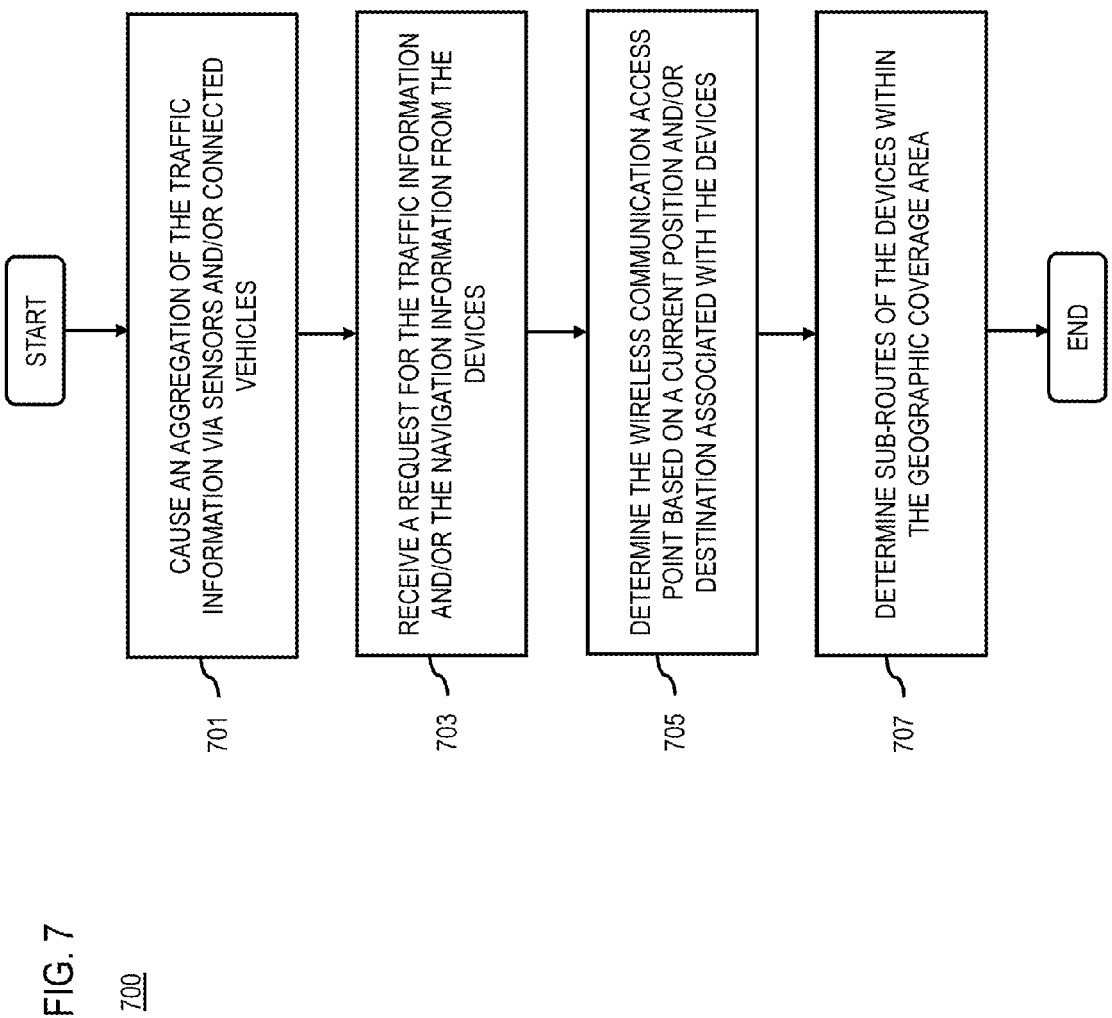
FIG. 7 is a flowchart of a process for selecting at least one wireless communication access point to determine one or more sub-routes within a geographic coverage area, according to one example embodiment.

FIG. 7 is a flowchart of a process for selecting at least one wireless communication access point to determine one or more sub-routes within the geographic coverage area of the at least one wireless communication access point, according to one example embodiment. In one embodiment, the wireless communication access point 109 performs the process 700 and is implemented in, for instance, a chip set including a processor and a memory as shown in FIG. 12.

In step 701, the wireless communication access point 109 may cause, at least in part, an aggregation of the traffic information via one or more sensors, one or more connected wireless devices, one or more connected vehicles, or a combination thereof. In one scenario, the wireless communication access point 109 may receive traffic information from one or more sensors 105 associated with at least one UE 101 and/or at least one vehicle 129. Then, the wireless communication access point 109 may aggregate the received traffic information to determine the traffic situation in at least one route segment.

In step 703, the wireless communication access point 109 may receive at least one request for the traffic information, the navigation information, or a combination thereof from the one or more devices. In one scenario, one or more devices associated with at least one vehicle may request for traffic updates and/or navigation guidance from at least one wireless communication access point.

In step 705, the wireless communication access point 109 may determine the at least one wireless communication access point based, at least in part, on at least one current position, at least one destination, at least one heading information, or a combination thereof associated with the one or more devices. In one embodiment, the at least one destination is specified by the one or more devices, estimated from contextual information, or a combination thereof.

In step 707, the wireless communication access point 109 may determine one or more sub-routes of the one or more devices within the at least one geographic coverage area. In one embodiment, the traffic information, the navigation information, or a combination thereof is further based, at least in part, on the one or more sub-routes.

Figure 8:
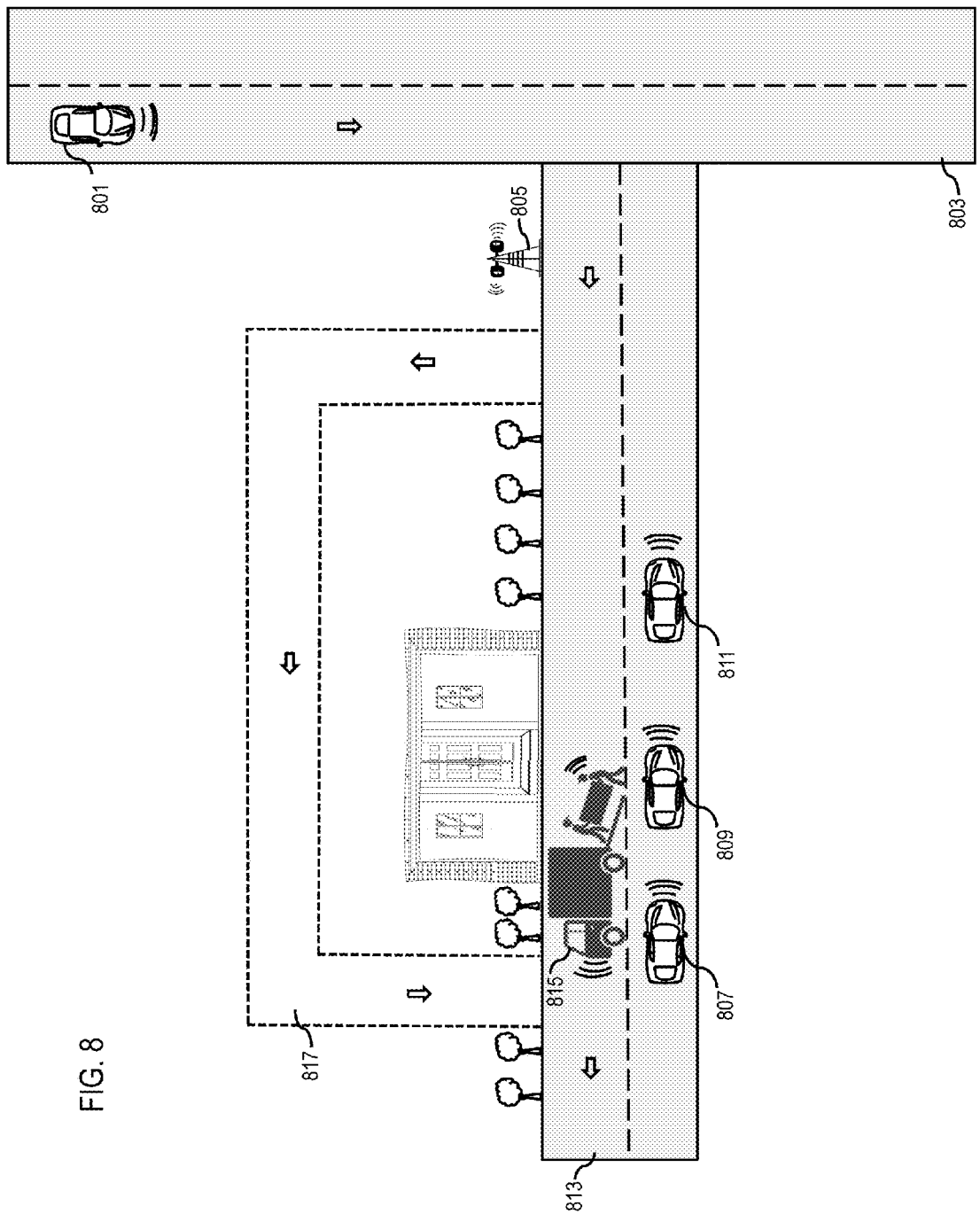
FIG. 8 is a diagram that represents a scenario wherein at least one wireless communication access point detects at least one vehicle momentarily blocking at least one road segment, according to one example embodiment.

FIG. 8 is a diagram that represents a scenario wherein at least one wireless communication access point detects at least one vehicle momentarily blocking at least one road segment, according to one example embodiment. In one scenario, vehicle 801 travelling on the road segment 803 may transmit position information, heading information, speed information, and/or destination information to the wireless communication access point 805 in real-time via sensors 105. Then, the wireless communication access point 805 may calculate one or more routes for the vehicle 801 and determine traffic information pertaining to road segments within the routes. The wireless communication access point 805 may determine that road segment 813 is within the route. In another scenario, one or more sensors 105 and/or one or more connected vehicles (815, 807, 809 and 811) may transmit traffic information pertaining to road segment 813 to the wireless communication access point 805 in real-time. The wireless communication access point 805 may process the traffic information to determine at least one obstruction in real-time at road segment 813. The wireless communication access point 805 may determine that if vehicle 801 travels through road segment 813, the path may be blocked by vehicle 815 that is improperly parked moments ago. Subsequently, the wireless communication access point 805 may calculate at least one alternative route 817 in real-time, and may notify at least one device 101 or 129 associated with vehicle 801 on the alternative route. Alternatively or additionally, the wireless communication access point 805 may notify the at least one device associated with the vehicle on the location of the blocked road segment 813. In one scenario, the wireless communication access point 805 may determine that at least one road segment should not be blocked based, at least in part, on the current local traffic situation. Then, the wireless communication access point 805 may notify one or more users to avoid any activity that obstructs the traffic in the determined road segment. In one example embodiment, the wireless communication access point 805 may not allow one or more vehicles to park at the alternative path 817 as long as the blocking vehicle 815 is obstructing the traffic. In one scenario, the wireless communication access point 805 may compute local and temporary bottlenecks within its coverage area, and present them to the drivers so that they are aware that they cannot stop and/or park there, specifically because most of the local traffic is being re-routed there.

Figure 9:
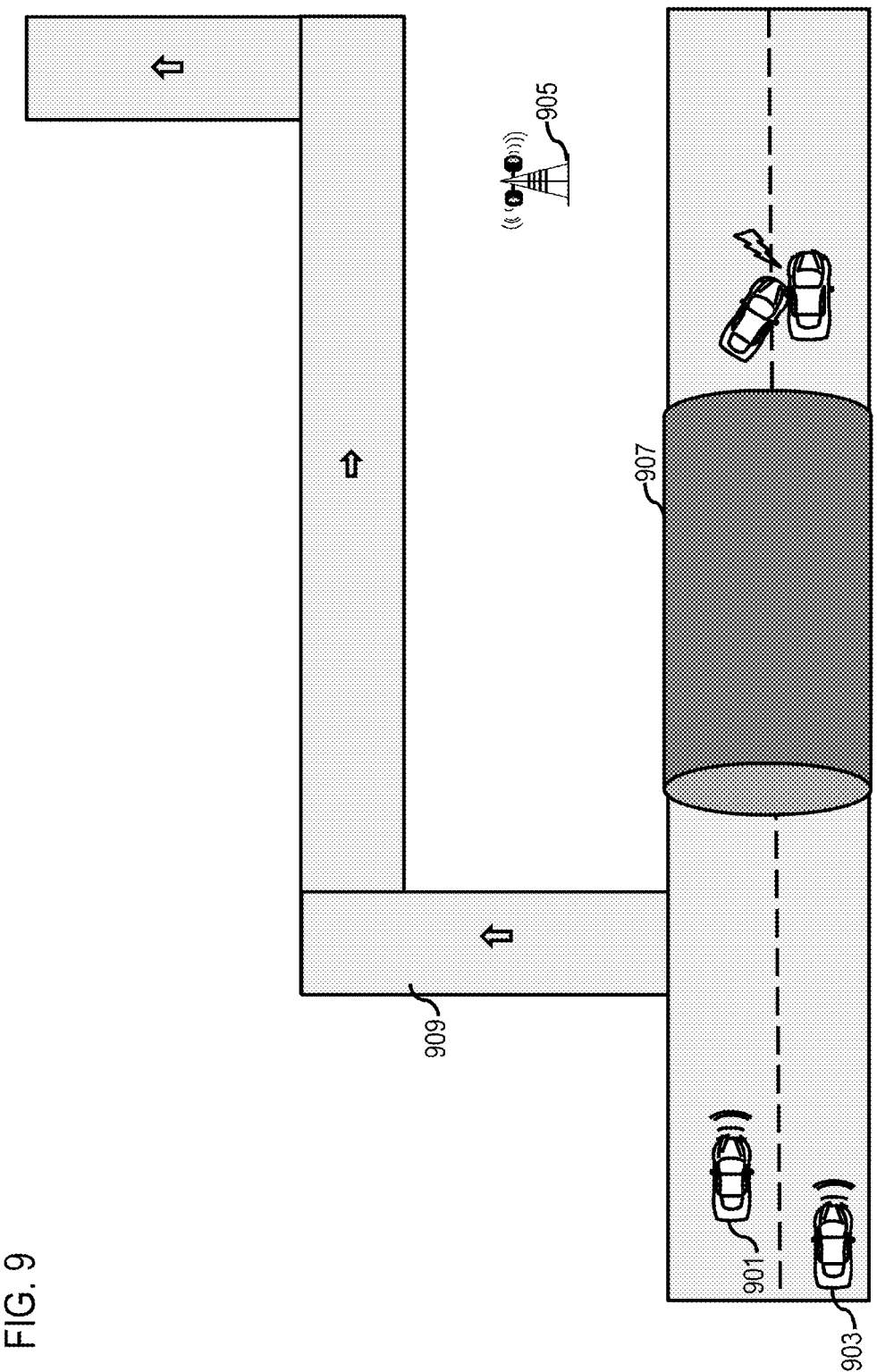
FIG. 9 is a diagram that represents a scenario wherein at least one wireless communication access point avoids at least one road segment based, at least in part, on detection of traffic disruption, according to one example embodiment.

FIG. 9 is a diagram that represents a scenario wherein at least one wireless communication access point avoids at least one road segment based, at least in part, on detection of traffic disruption, according to one example embodiment. In one scenario, vehicles 901 and 903 may transmit their position information and/or destination information to the wireless communication access point 905 in real-time via sensors 105. Then, the wireless communication access point 905 may calculate routing information for vehicles 901 and 903, and may determine that tunnel 907 is within the route. Subsequently, the wireless communication access point 905 may determine traffic information for tunnel 907, and may detect an accident on the other side of tunnel 907. Then, the wireless communication access point 905 may prevent vehicles 901 and 903 from entering the tunnel by notifying at least one device 101 or 129 associated with vehicles 901 and 903 about the accident and that the tunnel should be avoided. The wireless communication access point 905 may present an alternative route 909 to vehicles 901 and 903. In such manner, the wireless communication access point 905 improves evacuation options and access for emergency vehicles.

Figure 10:
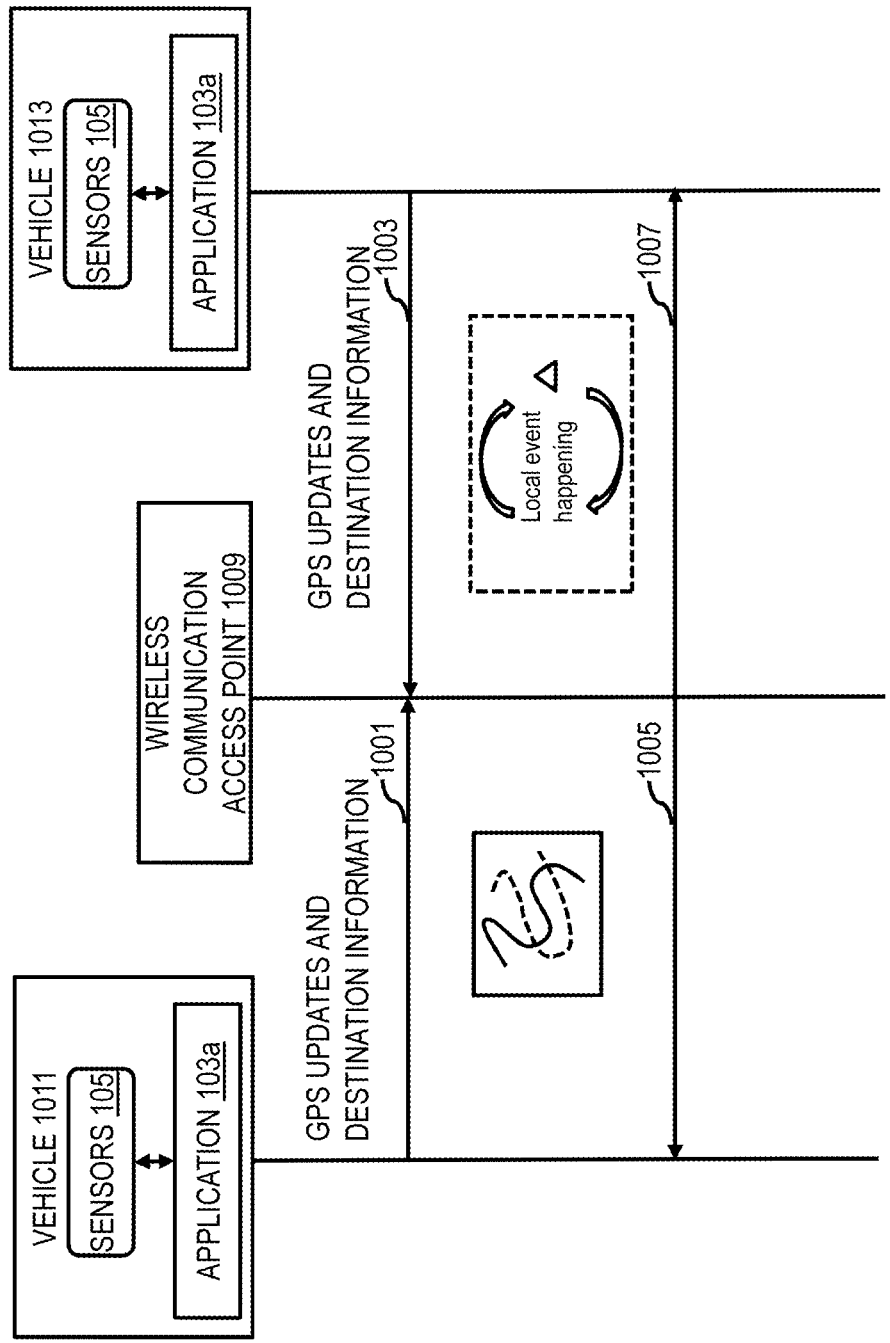
FIG. 10 is a ladder diagram utilized in the process of providing navigation information based on traffic information for a geographic coverage area, according to one example embodiment.

FIG. 10 is a ladder diagram utilized in the process of providing navigation information based on traffic information for a geographic coverage area, according to one example embodiment. In step 1001 and 1003, the wireless communication access point 1009 receives location related information (e.g., position information, destination information, heading information, speed information, etc.) from vehicle 1011 and vehicle 1013. Alternatively, the vehicle 1011 or 1013 can be a UE 101. Then, the wireless communication access point 1009 calculates routing information for vehicle 1011 and vehicle 1013. The process of calculating routing information involves determining any obstructions (e.g., road constructions, road accidents, local events, weather information, road condition, etc.) in road segments that falls within the routes. In one scenario, the wireless communication access point 1009 may determine one or more routes for vehicle 1011, wherein a recommended route may be presented as an image overlay on top of the other route of secondary preference (the dotted route). The preference of one route over the other may be based, at least in part, on distance information, traffic density information, etc. In another scenario, the wireless communication access point 1009 may detect an occurring of a local event in one of the road segment within a route for vehicle 1013. Then, the wireless communication access point 1009 may cause a re-routing for vehicle 1013, and determine an alternative route. Subsequently, in steps 1005 and 1007 the wireless communication access point 1009 transmits the navigation information to the vehicle 1011 and 1013 in different formats. In one scenario, preference for at least one alternative route may be based, at least in part, on load distribution of at least one road segment. The wireless communication access point 1009 may distribute traffic over different routes during peak hours, so that similar routes are not provided to one or more vehicles until the congestion is over. The preference for at least one route may be based on fastest route for the overall system to reduce load and congestion.

The processes described herein for providing navigation information based on traffic information for a geographic coverage area may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 11:
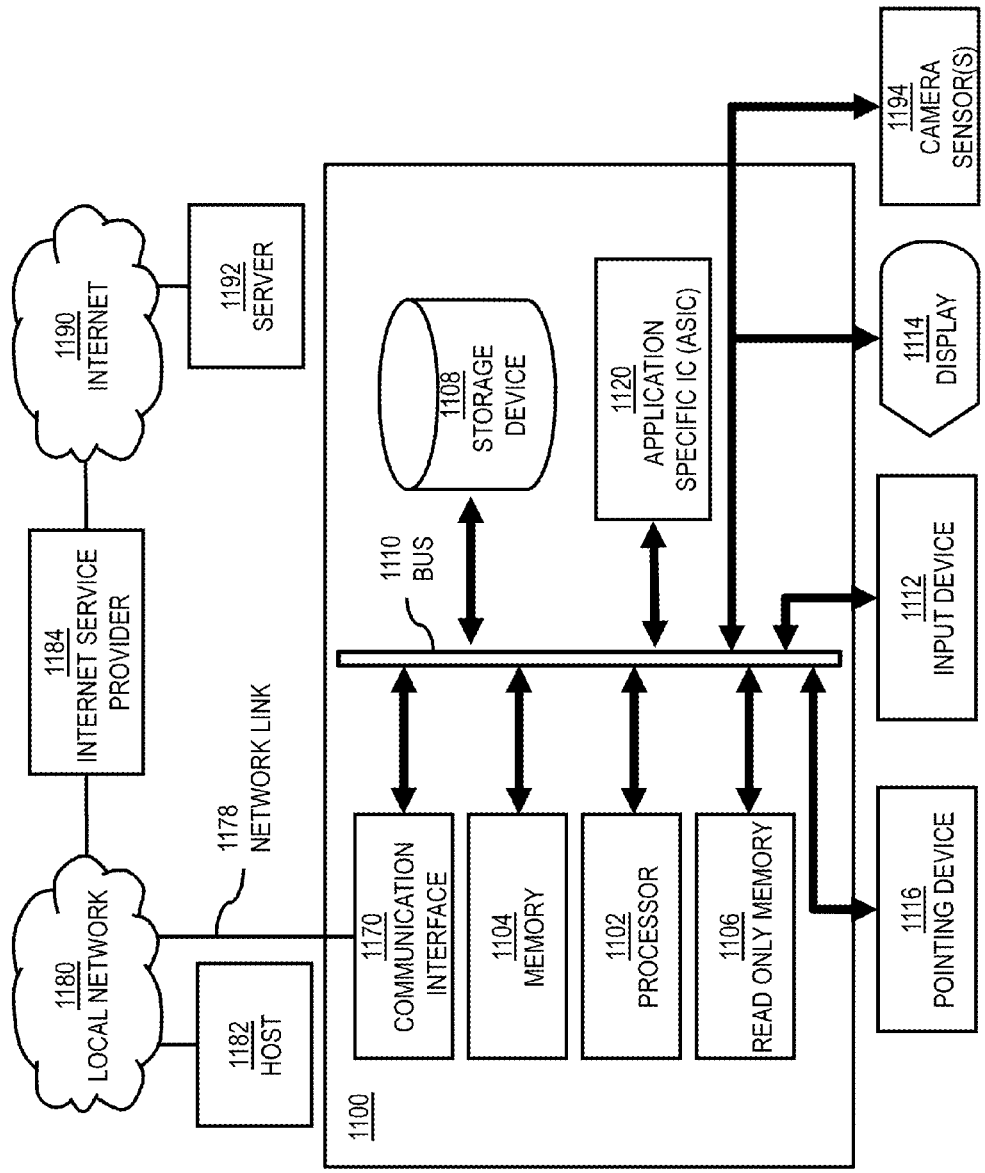
FIG. 11 is an example diagram of hardware that can be used to implement an embodiment of the invention.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) to provide navigation information based on traffic information for a geographic coverage area as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of providing navigation information based on traffic information for a geographic coverage area.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to provide navigation information based on traffic information for a geographic coverage area. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1100 also includes a memory 1104 coupled to bus 1110. The memory 1104, such as a random access memory (RAM) or any other dynamic storage device, stores information including processor instructions for providing navigation information based on traffic information for a geographic coverage area. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for providing navigation information based on traffic information for a geographic coverage area, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114, and one or more camera sensors 1194 for capturing, recording and causing to store one or more still and/or moving images (e.g., videos, movies, etc.) which also may comprise audio recordings. In some embodiments, for example, in embodiments in which the computer system 1100 performs all functions automatically without human input, one or more of external input device 1112, display device 1114 and pointing device 1116 may be omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for providing navigation information based on traffic information for a geographic coverage area to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

FIG. 12 illustrates a chip set or chip 1200 upon which an embodiment of the invention may be implemented. Chip set 1200 is programmed to provide navigation information based on traffic information for a geographic coverage area as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of providing navigation information based on traffic information for a geographic coverage area.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to provide navigation information based on traffic information for a geographic coverage area. The memory 1205 also stores the data associated with or generated by the execution of the inventive steps.

Figure 13:
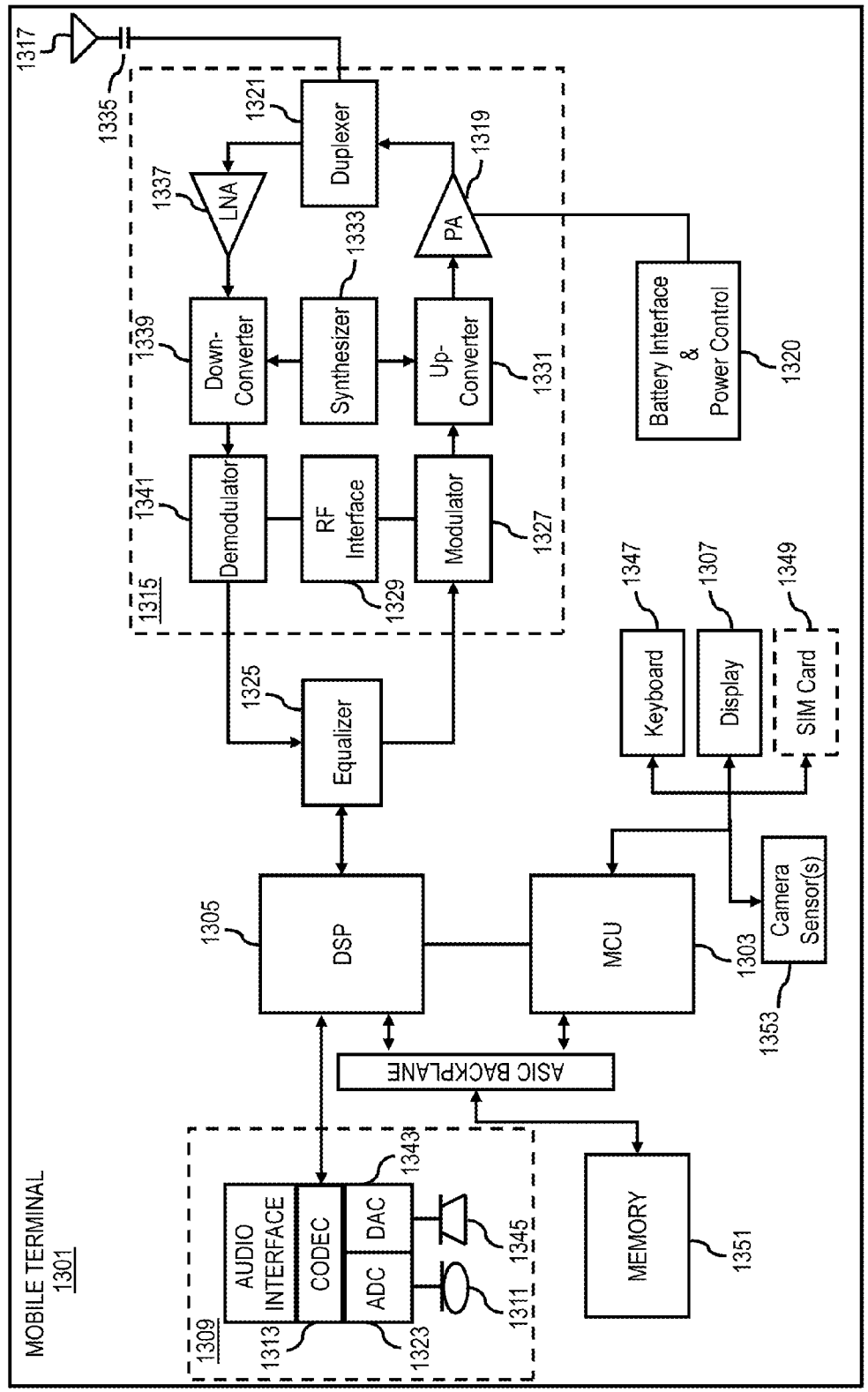
FIG. 13 is an example diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of providing navigation information based on traffic information for a geographic coverage area. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software and/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of providing navigation information based on traffic information for a geographic coverage area. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a wireless communication access point, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network wireless communication access point. The signal is then filtered within the duplexer 1321 and optionally sent to an antenna coupler 1335 to match impedances to provide maximum power transfer. Finally, the signal is transmitted via antenna 1317 to a local wireless communication access point. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 to provide navigation information based on traffic information for a geographic coverage area. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network.

The card 1349 also contains a memory for storing a personal telephone number registry, text messages, and user specific mobile terminal settings.

Further, one or more camera sensors 1353 may be incorporated onto the mobile station 1301 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving, at a wireless communication access point directly from a mobile device, navigation information of the mobile device that enters a geographic coverage area of the wireless communication access point, wherein
     the navigation information of the mobile device includes sensor data collected via at least one global positioning system receiver of the mobile device,
     the geographic coverage area is a cellular cell, and
     the wireless communication access point is fixed within the cellular cell and facilitates wireless communication between the mobile device and a network within the cellular cell;
   determining, by the wireless communication access point, one or more traffic updates in the geographic coverage area based, at least in part, on real-time travelling information of one or more other mobile devices received directly from the one or more other mobile devices;
   generating, by the wireless communication access point, re-routing information for the mobile device based, at least in part, on the traffic updates and map information stored at the wireless communication access point;
   transmitting the re-routing information from the wireless communication access point directly to the mobile device; and
   initiating a presentation of the re-routing information on a user interface of the mobile device.

2. The method of claim 1, further comprising:
   determining detour information, one or more alternative routes, or a combination thereof for the one or more other mobile devices based, at least in part, on the one or more traffic updates and the sensor data,
   wherein the wireless communication access point includes a base transceiver station, a base station controller, or a combination thereof, and the one or more traffic updates include one or more traffic obstructions.

3. The method of claim 1, further comprising:
   determining the wireless communication access point, one or more other wireless communication access points, or a combination thereof associated with at least one route of the one or more other mobile devices,
   wherein the wireless communication access point, the one or more other wireless communication access points, or a combination thereof provide navigation information, the one or more traffic updates, or a combination thereof for the geographic coverage area, one or more other geographic coverage areas associated with the one or more other wireless communication access points, or combination thereof as the mobile device and the one or more other mobile devices travel the at least one route.

4. The method of claim 3, further comprising:
   determining at least one destination of the mobile device and the one or more other mobile devices; and
   determining the at least one route based, at least in part, on the at least one destination and at least one current position of the mobile device and the one or more other mobile devices.

5. The method of claim 4, further comprising:
   initiating a transmission of the at least one destination, the at least one current position, the at least one route among the wireless communication access point, the one or more other wireless communication access points, or a combination thereof based, at least in part, on the at least one route, the one or more traffic updates, the navigation information, contextual information about the mobile device and the one or more other mobile devices, other contextual information associated with one or more vehicles associated with the mobile device and the one or more other mobile devices, or a combination thereof.

6. The method of claim 4, further comprising:
   receiving at least one request for the one or more traffic updates, the navigation information, or a combination thereof from the one or more other mobile devices; and
   determining the wireless communication access point based, at least in part, on at least one current position, at least one destination, or a combination thereof associated with the mobile device and the one or more other mobile devices,
   wherein the at least one destination is specified by the mobile device and the one or more other mobile devices, estimated from contextual information, or a combination thereof.

7. The method of claim 1, wherein the navigation information provided by the wireless communication access point, the one or more other wireless communication access point, or a combination thereof comprise at least one set of navigation guidance instructions for the at least one route.

8. The method of claim 7, further comprising:
   initiating a handover of functions of the traffic updates determining, the re-routing information transmitting, and transmitting the navigation guidance instructions to the mobile device and the one or more other mobile devices among the wireless communication access point, the one or more other wireless communication access points, or a combination thereof as the mobile device, the one or more other mobile devices, or a combination thereof travel the at least one route.

9. The method of claim 1, further comprising:
   initiating an aggregation of the one or more traffic updates via one or more sensors, one or more connected wireless devices, one or more connected vehicles, or a combination thereof.

10. The method of claim 1, further comprising:
    determining one or more sub-routes of the mobile device and the one or more other mobile devices within the geographic coverage area,
    wherein the one or more traffic updates, the navigation information, or a combination thereof is further based, at least in part, on the one or more sub-routes, and
    wherein the wireless communication access point is a base station.

11. An apparatus comprising:
at least one processor; and
at least one memory including computer program code for one or more programs,
the at least one memory and the computer program code configured to, with the at least one processor, cause the apparatus embedded in a wireless communication access point to perform at least the following:
receive, directly from a mobile device, navigation information of the mobile device that enters a geographic coverage area of the wireless communication access point, wherein
the navigation information of the mobile device includes sensor data collected via at least one global positioning system receiver of the mobile device,
the geographic coverage area is a cellular cell, and
the wireless communication access point is fixed within the cellular cell and facilitates wireless communication between the mobile device and a network within the cellular cell;
determine one or more traffic updates in the geographic coverage area based, at least in part, on real-time travelling information of one or more other mobile devices received directly from the one or more other mobile devices;
generate re-routing information for the mobile device based, at least in part, on the traffic updates and map information stored at the wireless communication access point;
transmit the re-routing information from the wireless communication access point directly to the mobile device; and
initiate a presentation of the re-routing information on a user interface of the mobile device.

12. The apparatus of claim 11, wherein the apparatus is further caused to:
determine detour information, one or more alternative routes, or a combination thereof for the one or more other mobile devices based, at least in part, on the one or more traffic updates and the sensor data,
wherein the wireless communication access point includes a base transceiver station, a base station controller, or a combination thereof, and the one or more traffic updates include one or more traffic obstructions.

13. The apparatus of claim 11, wherein the apparatus is further caused to:
determine the wireless communication access point, one or more other wireless communication access points, or a combination thereof associated with at least one route of the one or more other mobile devices,
wherein the wireless communication access point, the one or more other wireless communication access points, or a combination thereof provide navigation information, the one or more traffic updates, or a combination thereof for the geographic coverage area, one or more other geographic coverage areas associated with the one or more other wireless communication access points, or combination thereof as the mobile device and the one or more other mobile devices travel the at least one route.

14. The apparatus of claim 13, wherein the apparatus is further caused to:
determine at least one destination of the mobile device and the one or more other mobile devices; and
determine the at least one route based, at least in part, on the at least one destination and at least one current position of the mobile device and the one or more other mobile devices.

15. The apparatus of claim 14, wherein the apparatus is further caused to:
initiate a transmission of the at least one destination, the at least one current position, the at least one route among the wireless communication access point, the one or more other wireless communication access points, or a combination thereof based, at least in part, on the at least one route, the one or more traffic updates, the navigation information, contextual information about the mobile device and the one or more other mobile devices, other contextual information associated with one or more vehicles associated with the mobile device and the one or more other mobile devices, or a combination thereof.

16. The apparatus of claim 11, wherein the navigation information provided by the wireless communication access point, the one or more other wireless communication access point, or a combination thereof comprise at least one set of navigation guidance instructions for the at least one route.

17. The apparatus of claim 16, wherein the apparatus is further caused to:
initiate a handover of functions of the traffic updates determining, the re-routing information transmitting, and transmitting the navigation guidance instructions to the mobile device and the one or more other mobile devices among the wireless communication access point, the one or more other wireless communication access points, or a combination thereof as the mobile device, the one or more other mobile devices, or a combination thereof travel the at least one route.

18. A non-transitory computer-readable storage medium carrying one or more sequences of one or more instructions which, when executed by one or more processors, cause an apparatus embedded in a wireless communication access point to at least perform the following steps:
receiving, directly from a mobile device, navigation information of the mobile device that enters a geographic coverage area of the wireless communication access point, wherein
the navigation information of the mobile device includes sensor data collected via at least one global positioning system receiver of the mobile device,
the geographic coverage area is a cellular cell, and
the wireless communication access point is fixed within the cellular cell and facilitates wireless communication between the mobile device and a network within the cellular cell;
determining one or more traffic updates in the geographic coverage area based, at least in part, on real-time travelling information of one or more other mobile devices received directly from the one or more other mobile devices;
generating re-routing information for the mobile device based, at least in part, on the traffic updates and map information stored at the wireless communication access point;
transmitting the re-routing information from the wireless communication access point directly to the mobile device; and
initiating a presentation of the re-routing information on a user interface of the mobile device.

19. The non-transitory computer-readable storage medium of claim 18, wherein the apparatus is further caused to:
- determining detour information, one or more alternative routes, or a combination thereof for the one or more other mobile devices based, at least in part, on the one or more traffic updates and the sensor data,
- wherein the wireless communication access point includes a base transceiver station, a base station controller, or a combination thereof, and the one or more traffic updates include one or more traffic obstructions.

20. The non-transitory computer-readable storage medium of claim 18, wherein the apparatus is further caused to:
- determining the wireless communication access point, one or more other wireless communication access points, or a combination thereof associated with at least one route of the one or more other mobile devices,
- wherein the wireless communication access point, the one or more other wireless communication access points, or a combination thereof provide navigation information, the one or more traffic updates, or a combination thereof for the geographic coverage area, one or more other geographic coverage areas associated with the one or more other wireless communication access points, or combination thereof as the mobile device and the one or more other mobile devices travel the at least one route.

* * * * *